US008898314B2

(12) United States Patent
Cochran

(10) Patent No.: US 8,898,314 B2
(45) Date of Patent: Nov. 25, 2014

(54) DIRECT COMMUNICATION BETWEEN APPLICATIONS IN A CLOUD COMPUTING ENVIRONMENT

(75) Inventor: Marc J. Cochran, Shrewsbury, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 353 days.

(21) Appl. No.: 13/425,624

(22) Filed: Mar. 21, 2012

(65) Prior Publication Data

US 2013/0254411 A1  Sep. 26, 2013

(51) Int. Cl.
*G06F 15/16* (2006.01)
*G06F 15/173* (2006.01)
*H04L 29/06* (2006.01)
*G06F 21/44* (2013.01)
*H04W 12/08* (2009.01)

(52) U.S. Cl.
CPC ............. *H04L 63/10* (2013.01); *H04L 63/08* (2013.01); *G06F 21/44* (2013.01); *H04W 12/08* (2013.01)
USPC ............................... 709/227; 709/225; 726/3

(58) Field of Classification Search
CPC ...... H04L 63/08–63/108; H04W 12/06–12/08; G06F 21/44–21/445
USPC .......... 709/216, 223, 225, 227–229; 713/182–185; 726/2–10, 27–30
See application file for complete search history.

(56) References Cited

U.S. PATENT DOCUMENTS

| 2011/0047381 | A1* | 2/2011 | Ganesan et al. ............... 713/169 |
| 2011/0231652 | A1* | 9/2011 | Bollay et al. .................. 713/153 |
| 2012/0134600 | A1* | 5/2012 | Getzinger et al. ............. 382/232 |
| 2012/0222106 | A1* | 8/2012 | Kuehl .............................. 726/11 |
| 2012/0317619 | A1* | 12/2012 | Dattagupta et al. ............... 726/4 |
| 2013/0091557 | A1* | 4/2013 | Gurrapu ............................ 726/5 |
| 2013/0097698 | A1* | 4/2013 | Taveau et al. ................... 726/19 |
| 2013/0159520 | A1* | 6/2013 | Engelhart ..................... 709/225 |
| 2013/0191882 | A1* | 7/2013 | Jolfaei ............................. 726/4 |

* cited by examiner

*Primary Examiner* — Patrice Winder
*Assistant Examiner* — Julian Chang

(57) ABSTRACT

A device receives traffic destined for a first application, and the traffic is received from a second application via a virtual machine and an indirect connection. The device determines, based on the traffic, whether the second application is a known and trusted neighbor of the first application, and establishes a direct connection between the first application and the second application, when the second application is a known and trusted neighbor of the first application. The device also applies traffic rules to the direct connection, and enables the traffic to be directly and securely communicated between the first application and the second application via the direct connection.

20 Claims, 10 Drawing Sheets

DIRECT COMMUNICATION BETWEEN APPLICATIONS IN A CLOUD COMPUTING ENVIRONMENT

BACKGROUND

Cloud computing is the delivery of computing as a service rather than as a product, whereby shared resources, software, and information are provided to client devices (e.g., computers, smart phones, etc.) as a utility over a network, such as the Internet. Cloud computing environments provide computation, software, data access, and/or storage services that do not require end-user knowledge of a physical location and configuration of a system that delivers the services.

A data center is a facility used to house computer systems and associated components, such as telecommunication systems and storage systems. A data center generally includes redundant or backup power supplies, redundant data communications connections, environmental controls (e.g., air conditioning, fire suppression, etc.), and/or security devices. In one example, a data center may share information with a cloud computing environment that may be utilized by client devices.

A cloud device in a cloud computing environment may utilize a virtual machine (VM) that includes a software implementation of a machine (e.g., a computer) for executing a program like a physical machine. In one example, a virtual machine may enable applications provided in the cloud device, or in other cloud devices of the cloud computing environment, to securely communicate with one another. However, communications between the applications may need to follow a circuitous communication path from one application, to the virtual machine, and finally to the other application. Such a circuitous communication path may be time consuming and inefficient.

DETAILED DESCRIPTION OF PREFERRED EMBODIMENTS

The following detailed description refers to the accompanying drawings. The same reference numbers in different drawings may identify the same or similar elements.

Systems and/or methods described herein may enable a cloud computing environment to provide a direct connection between two or more neighboring applications so that the applications may securely communicate traffic without utilizing indirect connections to a virtual machine. In one example implementation, a cloud device in a cloud computing environment may receive traffic destined for a first application and to be executed by the cloud device. The traffic may be received from a second application via a virtual machine and an indirect connection with the second application. The cloud device may determine, based on the traffic, whether the second application is a known and trusted neighbor of the first application. The cloud device may make the first application a secure client and may make the second application a secure server, or vice versa, when the second application is a known and trusted neighbor of the first application. The cloud device may establish a direct connection between the first application and the second application based on the client-server relationship of the applications. The cloud device may apply traffic rules to the direct connection to prevent looping, and may enable traffic to be directly and securely communicated between the first application and the second application via the direct connection.

As used herein, the term "user" is intended to be broadly interpreted to include a client device, or a user of a client device.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

Figure 1:
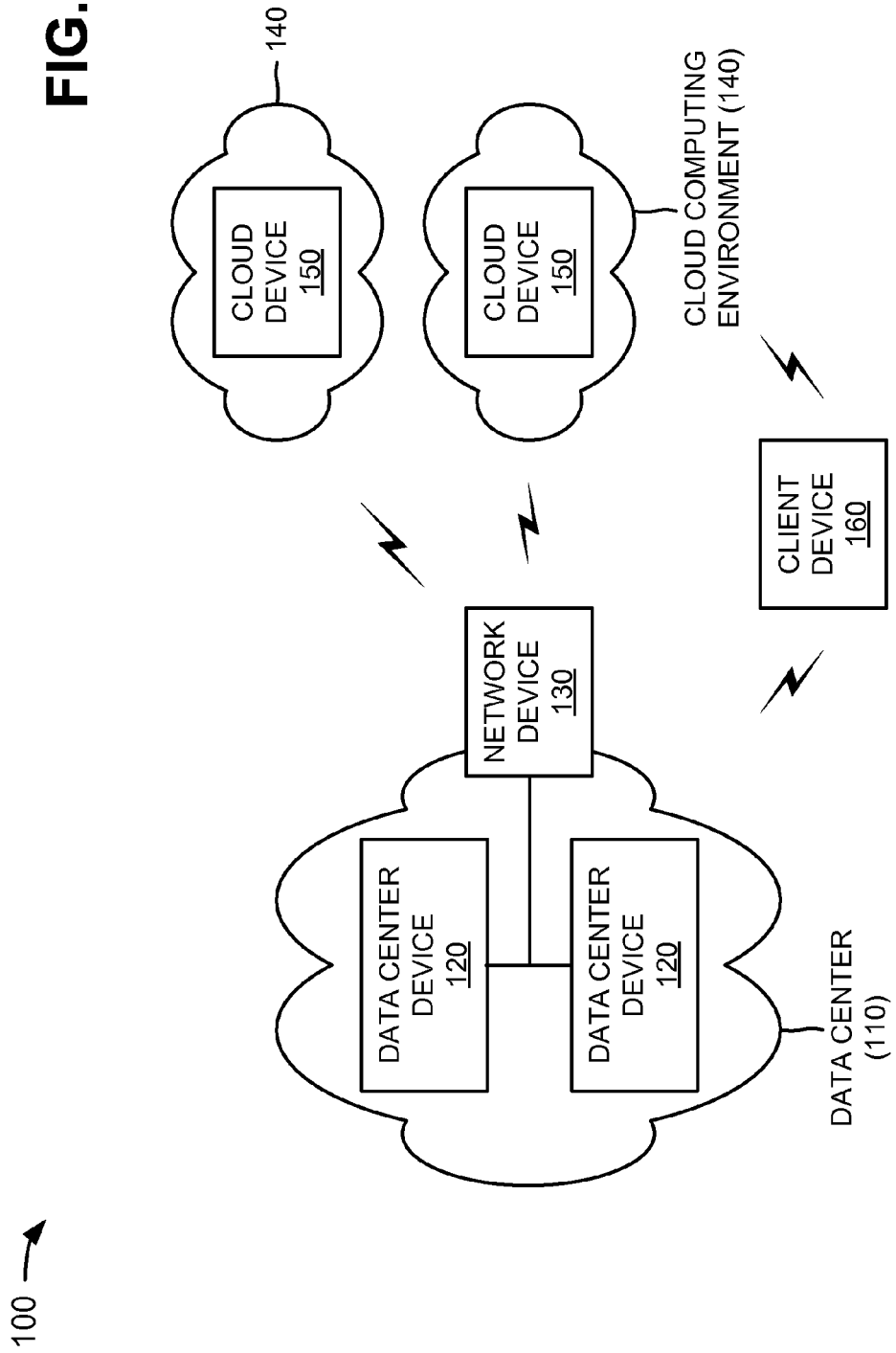
FIG. 1 is a diagram of an example network in which systems and/or methods described herein may be implemented.

FIG. 1 is a diagram of an example network 100 in which systems and/or methods described herein may be implemented. As illustrated, network 100 may include a data center 110 that includes data center devices 120 and a network device 130; cloud computing environments 140 that include cloud devices 150; and a client device 160. Devices and/or environments of network 100 may interconnect via wired and/or wireless connections. One data center 110, two data center devices 120, one network device 130, two cloud computing environments 140, two cloud devices 150, and one client device 160 have been illustrated in FIG. 1 for simplicity. In practice, there may be more data centers 110, data center devices 120, network devices 130, cloud computing environments 140, cloud devices 150, and/or client devices 160.

Data center 110 may include one or more facilities and/or one or more networks with computer systems, server devices, and associated components, such as telecommunications and storage systems. Data center 110 may include redundant or backup power supplies, redundant data communications connections, environmental controls, security devices, etc. In one example, data center 110 may share information, with cloud computing environment 140, which may be utilized by client device 160. Data center 110 may include resources, such as a device (e.g., a network device, a server, a computer system, etc.), data (e.g., availability information, license information, etc.), a service (e.g., a load balancing service, network information collection, etc.), etc.

Data center device 120 may include one or more server devices, or other types of computation and communication devices, that gather, process, search, and/or provide information in a manner described herein. In one example implementation, data center device 120 may receive shared resources, services, user objects, etc. from cloud computing environments 140 and/or cloud devices 150.

Network device 130 may include a gateway, a router, a switch, a firewall, a network interface card (NIC), a hub, a bridge, a proxy server, a multiplexer, or some other type of device that processes and/or transfers traffic. In one example implementation, network device 130 may include a firewall that creates encrypted tunnels with cloud devices 150 so that secure data paths may be provided between data center devices 120 and cloud devices 150.

Cloud computing environment 140 may include an environment that delivers computing as a service, whereby shared resources, services, user objects, etc. may be provided to data center device 120 and/or client device 160 as a utility over a network. Cloud computing environment 140 may provide computation, software, data access, and/or storage services that do not require end-user (e.g., data center device 120 and/or client device 160) knowledge of a physical location and configuration of system(s) and/or device(s) that deliver the services. In one implementation, cloud computing environment 140 may include a data center similar to data center 110.

Cloud device 150 may include one or more server devices, or other types of computation and communication devices, that gather, process, search, and/or provide information in a manner described herein. In one example implementation, cloud device 150 may provide cloud resources, cloud services, cloud user objects, etc. to data center device 120 and/or client device 160 as a utility over a network.

The cloud resources may include a compute instance executing in cloud device 150, a storage device provided in cloud device 150, a data transfer operation executed by cloud device 150, etc. The cloud services may include a virtual machine executing in cloud device 150, a virtual tunnel provided between network device 130 and cloud device 150, etc. The cloud user objects may include a server (e.g., a virtual machine of cloud device 150) that is managed by data center device 120.

Client device 160 may include a radiotelephone; a personal communications system (PCS) terminal that may combine, for example, a cellular radiotelephone with data processing and data communications capabilities; a smart phone; a personal digital assistant (PDA) that can include a radiotelephone, a pager, Internet/intranet access, etc.; a laptop computer; a tablet computer; a desktop computer; a workstation computer; or other types of computation and communication devices.

Although FIG. 1 shows example devices/networks of network 100, in other implementations, network 100 may include fewer devices/networks, different devices/networks, differently arranged devices/networks, or additional devices/networks than depicted in FIG. 1. Alternatively, or additionally, one or more devices/networks of network 100 may perform one or more tasks described as being performed by one or more other devices/networks of network 100.

Figure 2:
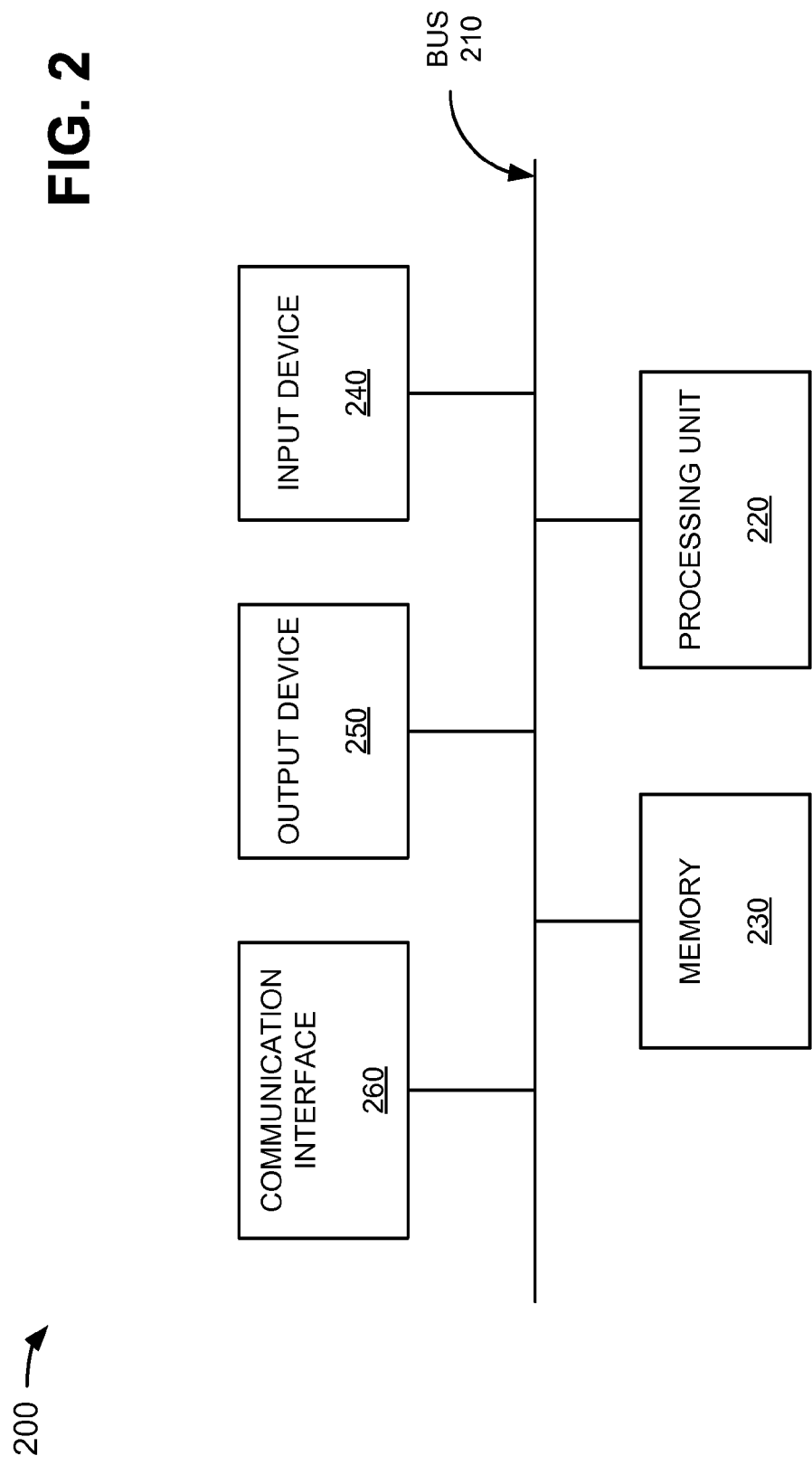
FIG. 2 is a diagram of example components of a device that may correspond to one of the devices of the network depicted in FIG. 1.

FIG. 2 is a diagram of example components of a device 200 that may correspond to one or more devices of network 100 (FIG. 1). In one example implementation, one or more of the devices of network 100 may include one or more devices 200 or one or more components of device 200. As illustrated in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more ASICs, FPGAs, or the like.

Memory 230 may include a RAM or another type of dynamic storage device that stores information and instructions for execution by processing unit 220, a ROM or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, a touch screen display, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices, such as other devices of network 100.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, or additionally, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more tasks described as being performed by one or more other components of device 200.

Figure 3:
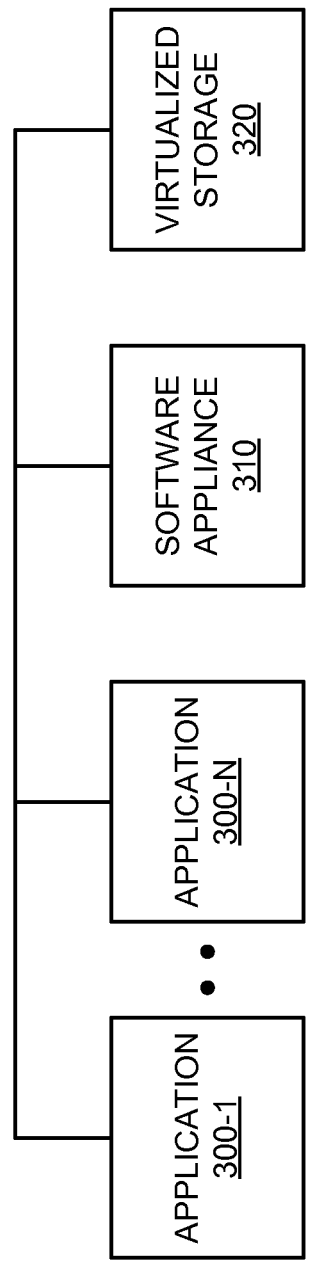
FIG. 3 is a diagram of example functional components of a data center device of FIG. 1.

FIG. 3 is a diagram of example functional components of data center device 120. In one implementation, the functions described in connection with FIG. 3 may be performed by one or more components of device 200 (FIG. 2) or by one or more devices 200. As shown in FIG. 3, data center device 120 may include multiple applications 300-1 through 300-N (collectively referred to herein as "applications 300," and, in some instances, singularly as "application 300"), a software appliance 310, and virtualized storage 320.

Applications 300 may include one or more software applications, available at data center device 120, which may depend upon the function of data center device 120. For example, applications 300 may include software that handles core business and operational data of an organization, enterprise software, telecommunications software, etc. Applications 300 may be designed for execution by multiple host devices, where each host device may execute a single component. In one example, components of applications 300 may include databases, file servers, application servers, middleware, etc.

Software appliance 310 may securely bridge data center device 120 with cloud computing services provided by cloud computing environment 140. Software appliance 310 may extend data center 110 security and control into cloud computing environment 140. This may allow applications 300 to remain integrated with data center 110 tools and policies and to be managed as if applications 300 were executing locally. Software appliance 310 may move applications 300 between data center 110 and cloud computing environment 140 based on requirements of an organization. In one example, software appliance 310 may include management components for discovering applications 300, orchestrating cloud deployments, and/or managing cloud utilization. Software appliance 310 may create a secure data path to bridge network connectivity between data center 110 and a chosen provider of cloud computing environment 140. In one example implementation, data center device 120 may utilize multiple software appliances 310 for availability and scaling purposes.

Virtualized storage 320 may include one or more storage systems and/or one or more devices that use virtualization techniques to enable better functionality and more advanced features within the storage systems and/or the devices of data center device 120. In one example, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system greater flexibility in how they manage storage for end users. File virtualization may eliminate dependencies between data accessed at a file level and a location where files are physically stored. This may enable optimization of storage use, server consolidation, and/or performance of non-disruptive file migrations.

Although FIG. 3 shows example functional components of data center device 120, in other implementations, data center device 120 may include fewer functional components, different functional components, differently arranged functional components, or additional functional components than depicted in FIG. 3. Additionally, or alternatively, one or more functional components of data center device 120 may perform one or more tasks described as being performed by one or more other functional components of data center device 120.

Figure 4:
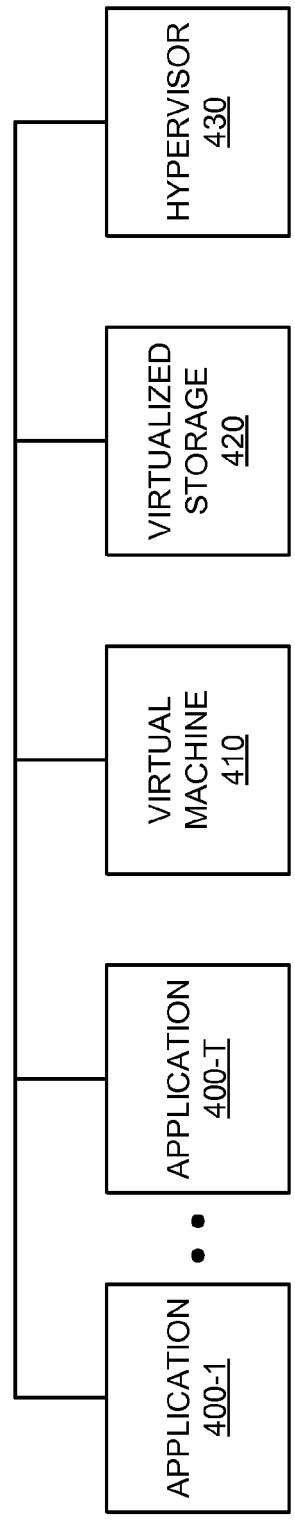
FIG. 4 is a diagram of example functional components of a cloud device of FIG. 1.

FIG. 4 is a diagram of example functional components of cloud device 150. In one implementation, the functions described in connection with FIG. 4 may be performed by one or more components of device 200 (FIG. 2) or by one or more devices 200. As shown in FIG. 4, cloud device 150 may include multiple applications 400-1 through 400-T (collectively referred to herein as "applications 400," and, in some instances, singularly as "application 400"), a virtual machine 410, virtualized storage 420, and a hypervisor 430.

Applications 400 may include one or more software applications that may be provided to or accessed by client device 160. Applications 400 may eliminate a need to install and execute the software applications on client device 160. For example, applications 400 may include word processing software, database software, content, monitoring software, financial software, communication software, and/or any other software capable of being provided via cloud computing environment 140. In one example implementation, one application 400 may communicate information (e.g., traffic) with one or more other applications 400, via virtual machine 410.

Virtual machine (VM) 410 may include a software implementation of a machine (e.g., a computer) that executes programs like a physical machine. Virtual machine 410 may be either a system virtual machine or a process virtual machine, depending upon use and degree of correspondence to any real machine by virtual machine 410. A system virtual machine may provide a complete system platform that supports execution of a complete operating system (OS). A process virtual machine may execute a single program, and may support a single process. In one example implementation, virtual machine 410 may execute on behalf of a data center 110 user (e.g., client device 160), and may manage infrastructure of cloud computing environment 140, such as data management, synchronization, and long-duration data transfers. Virtual machine 410 may provide encryption services for network and storage utilization to ensure that cloud computing environment providers do not have access to data center 110 network or storage communications.

Virtualized storage 420 may include one or more storage systems and/or one or more devices that use virtualization techniques to enable better functionality and more advanced features within the storage systems or devices of cloud device 150. In one example, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system greater flexibility in how they manage storage for end users. File virtualization may eliminate dependencies between data accessed at a file level and a location where files are physically stored. This may enable optimization of storage use, server consolidation, and/or performance of non-disruptive file migrations.

Hypervisor 430 may provide hardware virtualization techniques that allow multiple operating systems (e.g., "guest operating systems") to execute concurrently on a host computer. Hypervisor 430 may present to the guest operating systems a virtual operating platform, and may manage the execution of the guest operating systems. Multiple instances of a variety of operating systems may share virtualized hardware resources. Hypervisor 430 may provide an interface to infrastructure as a service (IaaS) provided by cloud computing environment 140.

Although FIG. 4 shows example functional components of cloud device 150, in other implementations, cloud device 150 may include fewer functional components, different functional components, differently arranged functional components, or additional functional components than depicted in FIG. 4. Additionally, or alternatively, one or more functional components of cloud device 150 may perform one or more tasks described as being performed by one or more other functional components of cloud device 150.

Figure 5:
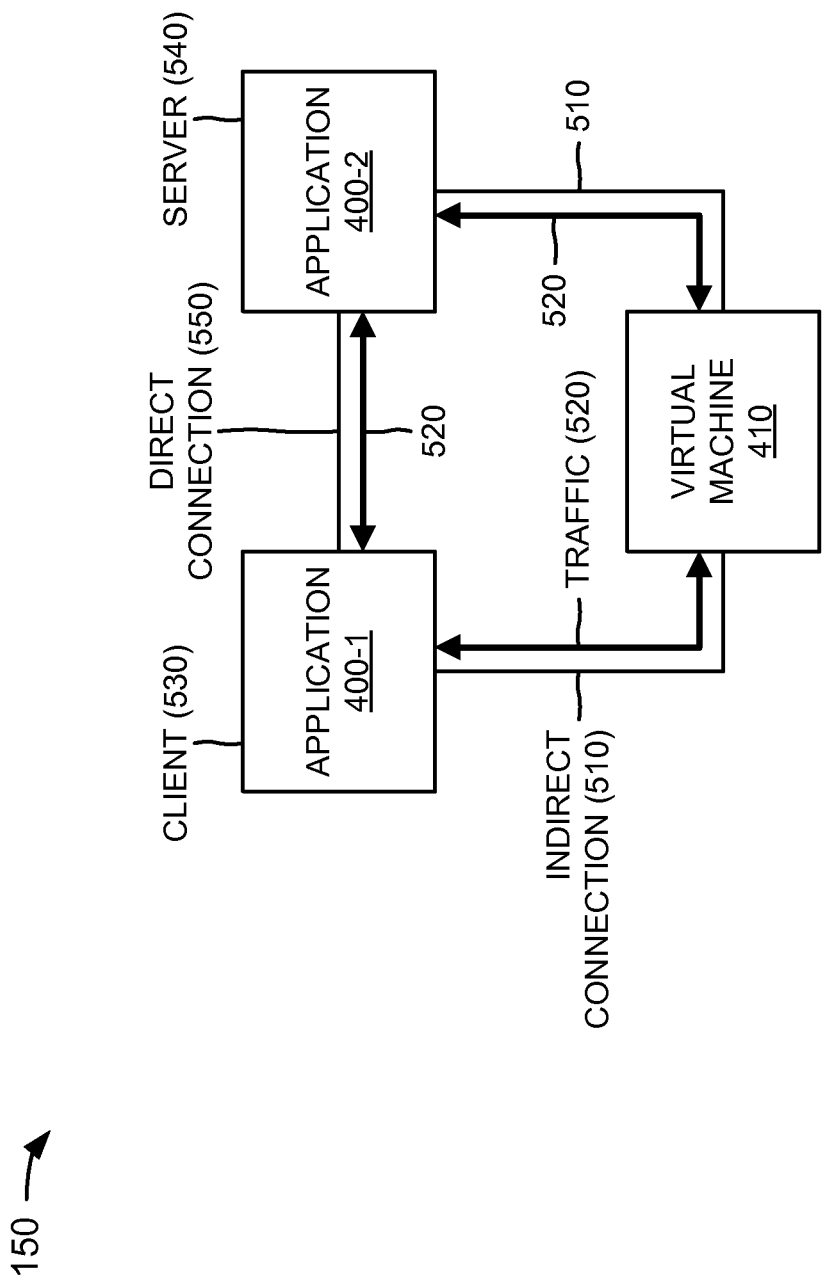
FIG. 5 is a diagram of example operations capable of being performed by functional components of the cloud device.

FIG. 5 is a diagram of example operations capable of being performed by functional components of cloud device 150. As shown, cloud device 150 may include a first application 400-1, a second application 400-2, and virtual machine 410. Cloud device 150, first application 400-1, second application 400-2, and virtual machine 410 may include the features described above in connection with, for example, one or more of FIGS. 1, 2, and 4.

In one example implementation, cloud device 150 may execute a continuous loop protocol, such as, for example, a spanning tree protocol. The spanning tree protocol may ensure a loop-free topology for any bridged Ethernet local area network, and may prevent bridge loops. The spanning tree protocol may permit a network design to include backup or redundant links that provide automatic backup paths if an active or primary link fails, without the danger of bridge loops, or the need for manual enabling/disabling of the backup links.

As further shown in FIG. 5, cloud device 150, may establish an indirect connection 510 between first application 400-1 and virtual machine 410, and may establish another indirect connection 510 between second application 400-2 and virtual machine 410. Indirect connections 510 may include links and may enable applications 400-1 and 400-2 to securely exchange traffic 520 via virtual machine 410. The term traffic, as used herein, is intended to be broadly construed to include a frame, a datagram, a packet, or a cell; a fragment of a frame, a fragment of a datagram, a fragment of a packet, or a fragment of a cell; or another type, arrangement, or packaging of data. In one example, virtual machine 410 may enable secure (e.g., encrypted) communication of information, such as traffic 520, between first application 400-1 and second application 400-2.

In one example implementation, cloud device 150 (e.g., via first application 400-1) may analyze traffic 520 received from second application 400-2 to determine whether second application 400-2 is a known and trusted neighbor of first application 400-1. For example, first application 400-1 may provide an address request message (e.g., an address resolution protocol (ARP) request) to second application 400-2 via indirect connection 510. Second application 400-2 may respond to the address request message, via indirect connection 510, with a reply message (e.g., an ARP reply back) that includes address information associated with second application 400-2. The address information may include an Ethernet address of a server associated with second application 400-2, an Internet protocol (IP) address of second application 400-2, etc. Cloud device 150 may compare the address information with a data structure (e.g., a database, a table, a tree, or another arrangement of data) maintained by cloud device 150. In one example, the data structure may include a list of addresses of applications that are known and trusted neighbors of first application 400-1, addresses of servers that host such applications, etc.

If the address information does not match an address provided in the data structure, cloud device 150 may determine that second application 400-2 is not a known and trusted neighbor of first application 400-1. Accordingly, cloud device 150 may permit first application 400-1 and second application 400-2 to continue to securely exchange traffic 520 via virtual machine 410 and indirect connections 510.

However, if the address information matches an address provided in the data structure, cloud device 150 may determine that second application 400-2 is a known and trusted neighbor of first application 400-1. When second application 400-2 is known and trusted, cloud device 150 may designate first application 400-1 as a secure client 530 and may designate second application 400-2 as a secure server 540 for purposes of exchanging information. Alternatively, cloud device 150 may designate second application 400-2 as secure client 530 and may designate first application 400-1 as secure server 540 for purposes of exchanging information. Based on the secure client-server relationship between applications 400-1 and 400-2, cloud device 150 may establish a direct connection 550 between first application 400-1 and second application 400-2. Direct connection 550 may include a link and may enable traffic 520 to be directly and securely communicated between first application 400-1 and second application 400-2.

In one example implementation, the continuous loop protocol may not be applied to direct connection 550 because the continuous loop protocol may break direct connection 550 to prevent looping. However, without the continuous loop protocol, looping may still occur. Thus, cloud device 150 may apply various traffic rules to direct connection 550 in order to prevent looping via direct connection 550 and indirect connections 510. For example, first application 400-1 may ignore traffic received from virtual machine 410, via indirect connection 510, when the traffic includes an address associated with second application 400-2. First application 400-1 may ignore such traffic since first application 400-1 may already receive the traffic directly from second application 400-2, via direct connection 550. Alternatively, or additionally, first application 400-1 may drop traffic received from direct connection 550, when the traffic includes an address that is not associated with second application 400-2. Such a traffic rule may prevent first application 400-1 from receiving traffic from an untrusted source via direct connection 550. Alternatively, or additionally, second application 400-2 may apply analogous traffic rules instead of or in addition to first application 400-1.

Although FIG. 5 shows example operations capable of being performed by functional components of cloud device 150, in other implementations, cloud device 150 may include fewer functional components, different functional components, differently arranged functional components, or additional functional components than depicted in FIG. 5. Additionally, or alternatively, one or more functional components of cloud device 150 may perform one or more tasks described as being performed by one or more other functional components of cloud device 150.

Figure 6:
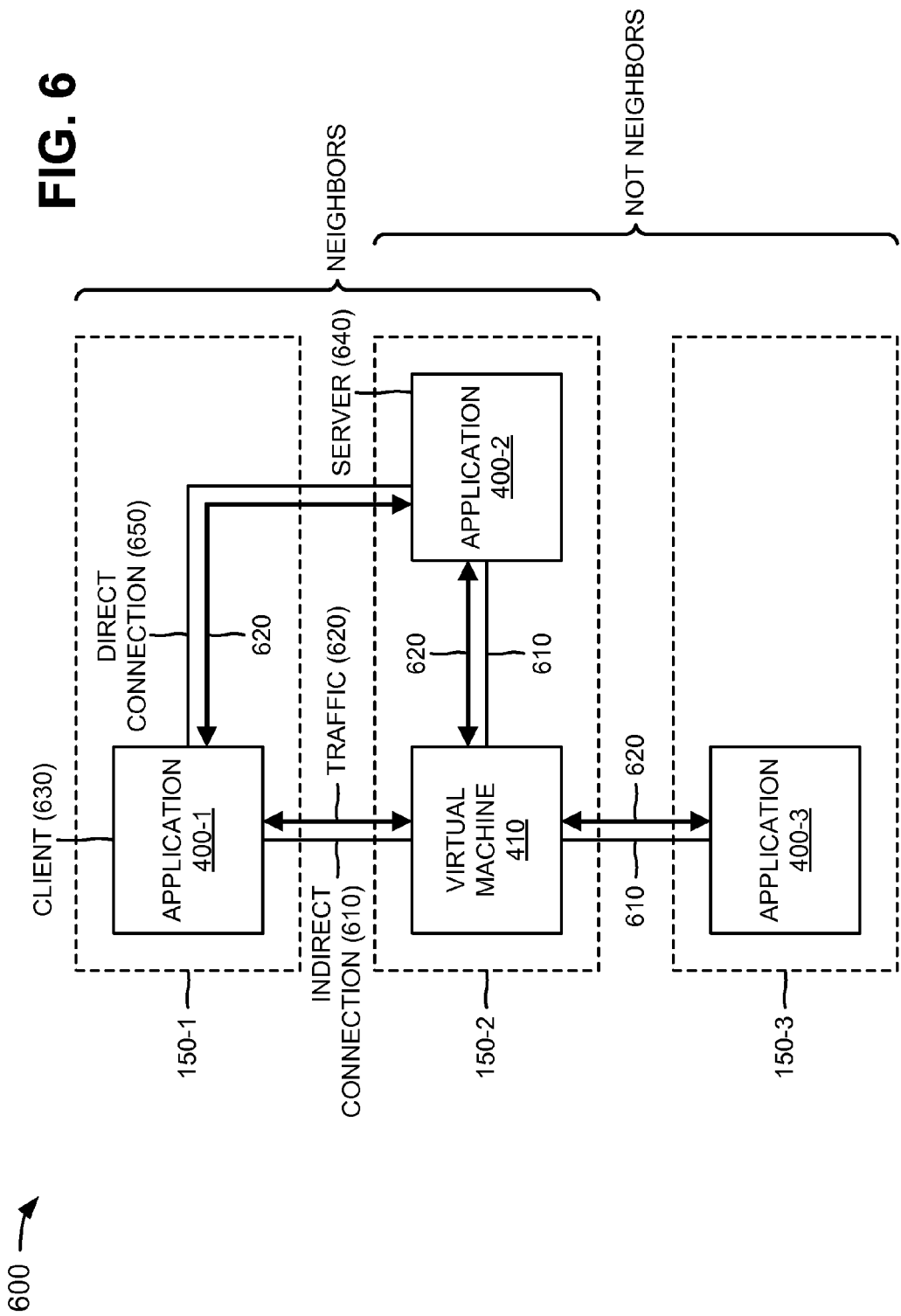
FIG. 6 is a diagram of example operations capable of being performed by an example portion of the network depicted in FIG. 1.

FIG. 6 is a diagram of example operations capable of being performed by an example portion 600 of network 100 (FIG. 1). As shown, example network portion 600 may include a first cloud device 150-1, a second cloud device 150-2, and a third cloud device 150-3. First cloud device 150-1 may include first application 400-1, second cloud device 150-2 may include second application 400-2 and virtual machine 410, and third cloud device 150-3 may include a third application 400-3. First cloud device 150-1, second cloud device 150-2, third cloud device 150-3, first application 400-1, second application 400-2, third application 400-3, and virtual machine 410 may include the features described above in connection with, for example, one or more of FIGS. 1, 2, 4, and 5. In one example implementation, cloud devices 150-1, 150-2, and 150-3 may execute a continuous loop protocol, such as, for example, a spanning tree protocol.

As further shown in FIG. 6, cloud devices 150-1 and 150-2 may establish an indirect connection 610 between first application 400-1 and virtual machine 410. Second cloud device 150-2 may establish another indirect connection 610 between second application 400-2 and virtual machine 410. Cloud devices 150-2 and 150-3 may establish an indirect connection 610 between third application 400-3 and virtual machine 410. Indirect connections 610 may include links and may enable applications 400-1, 400-2, and 400-3 to securely exchange traffic 620 via virtual machine 410. In one example, virtual machine 410 may enable secure (e.g., encrypted) communication of information, such as traffic 620, between first application 400-1 and second application 400-2, between first application 400-1 and third application 400-3, and between second application 400-2 and third application 400-3.

In one example implementation, first cloud device 150-1, via first application 400-1, may analyze traffic 620 received from second application 400-2 to determine whether second application 400-2 is a known and trusted neighbor of first application 400-1. For example, first application 400-1 may provide an address request message (e.g., an ARP request) to second application 400-2. Second application 400-2 may respond to the address request message with a reply message (e.g., an ARP reply back) that includes address information associated with second application 400-2. The address information may include an Ethernet address of a server associated with second application 400-2, an IP address of second application 400-2, etc. First cloud device 150-1 may compare the address information with a data structure (e.g., a database, a table, a tree, or another arrangement of data) maintained by first cloud device 150-1. In one example, the data structure may include a list of addresses of applications that are known and trusted neighbors of first application 400-1, addresses of servers that host such applications, etc.

If the address information does not match an address provided in the data structure, first cloud device 150-1 may determine that second application 400-2 is not a known and trusted neighbor of first application 400-1. Accordingly, first cloud device 150-1 may permit first application 400-1 and second application 400-2 to continue to securely exchange traffic 620 via virtual machine 410 and indirect connections 610.

However, since first cloud device 150-1 and second cloud device 150-2 are known and trusted neighbors, as shown in FIG. 6, the address information may match an address provided in the data structure. Because the address information matches an address provided in the data structure, first cloud device 150-1 may determine that second application 400-2 is a known and trusted neighbor of first application 400-1. When second application 400-2 is known and trusted, first cloud device 150-1 may designate first application 400-1 as a secure client 630 and may designate second application 400-2 as a secure server 640 for purposes of exchanging information. Alternatively, first cloud device 150-1 may designate second application 400-2 as secure client 630 and may designate first application 400-1 as secure server 640 for purposes of exchanging information. Based on the secure client-server relationship between applications 400-1 and 400-2, first cloud device 150 may establish a direct connection 650 between first application 400-1 and second application 400-2. Direct connection 650 may include a link and may enable traffic 620 to be directly and securely communicated between first application 400-1 and second application 400-2.

In one example implementation, the continuous loop protocol may not be applied to direct connection 650 because the continuous loop protocol may break direct connection 650 to prevent looping. However, without the continuous loop protocol, looping may still occur. Thus, first cloud device 150-1 may apply various traffic rules to direct connection 650 in order to prevent looping via direct connection 650 and indirect connections 610. For example, first application 400-1 may ignore traffic received from virtual machine 410, via indirect connection 610, when the traffic includes an address associated with second application 400-2. Alternatively, or additionally, first application 400-1 may drop traffic received from direct connection 650, when the traffic includes an address that is not associated with second application 400-2. Alternatively, or additionally, second application 400-2 may apply analogous traffic rules instead of or in addition to first application 400-1.

Second cloud device 150-2 (e.g., via first application 400-2) may analyze traffic 620 received from third application 400-3 to determine whether third application 400-3 is a known and trusted neighbor of second application 400-2. For example, second application 400-2 may provide an address request message (e.g., an ARP request) to third application 400-3. Third application 400-3 may respond to the address request message with a reply message (e.g., an ARP reply back) that includes address information associated with third application 400-3. The address information may include an Ethernet address of a server associated with third application 400-3, an IP address of third application 400-3, etc. Second cloud device 150-2 may compare the address information with a data structure (e.g., a database, a table, a tree, or another arrangement of data) maintained by second cloud device 150-2. In one example, the data structure may include a list of addresses of applications that are known and trusted neighbors of second application 400-2, addresses of servers that host such applications, etc.

However, since second cloud device 150-2 and third cloud device 150-3 are not known and trusted neighbors, as shown in FIG. 6, the address information may not match an address provided in the data structure. Because the address information does not match an address provided in the data structure, second cloud device 150-2 may determine that third application 400-3 is not a known and trusted neighbor of second application 400-2. Accordingly, second cloud device 150-2 may permit second application 400-2 and third application 400-3 to continue to securely exchange traffic 620 via virtual machine 410 and indirect connections 610.

Although FIG. 6 shows example operations capable of being performed by components of example network portion 600, in other implementations, example network portion 600 may include fewer components, different components, differently arranged components, or additional components than depicted in FIG. 6. Additionally, or alternatively, one or more components of example network portion 600 may perform one or more tasks described as being performed by one or more other components of example network portion 600.

Figure 7:
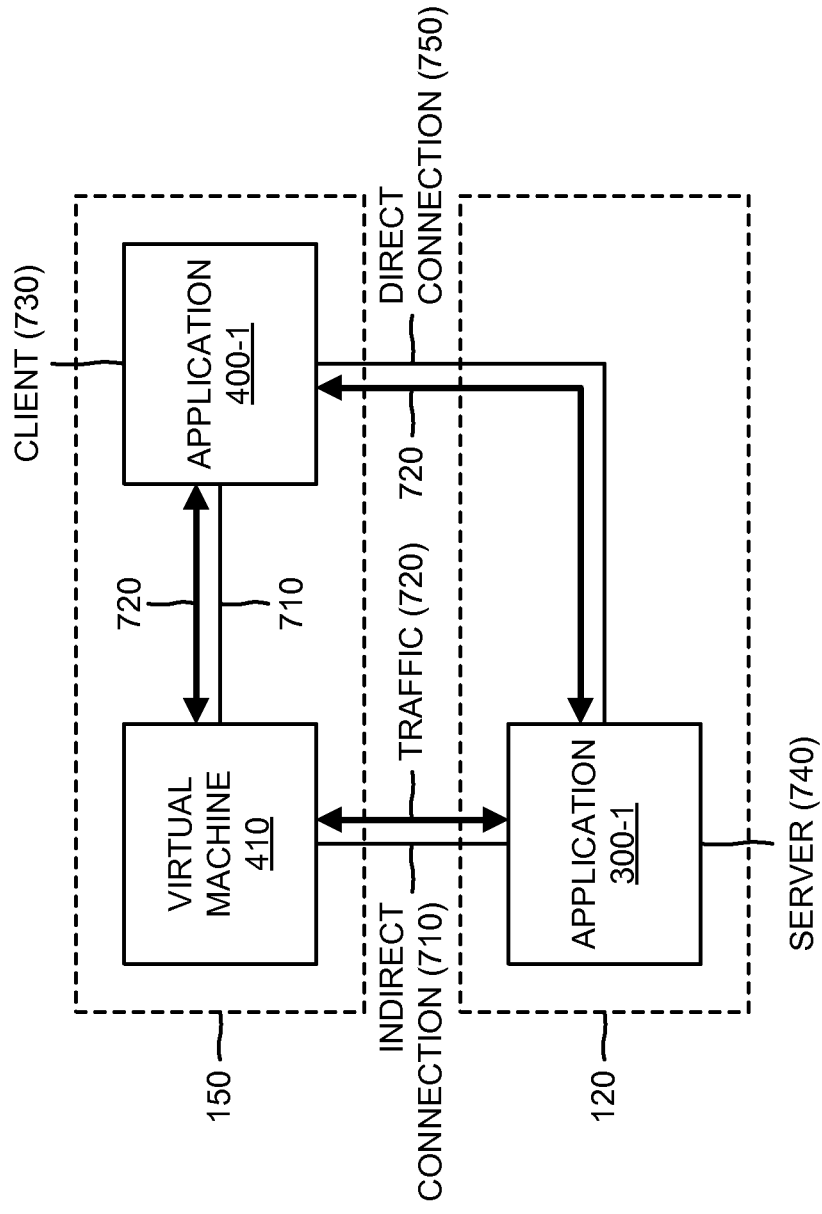
FIG. 7 is a diagram of example operations capable of being performed by another example portion of the network depicted in FIG. 1.

FIG. 7 is a diagram of example operations capable of being performed by another example portion 700 of network 100 (FIG. 1). As shown, example network portion 700 may include data center device 120 and cloud device 150. Data center device 120 may include application 300-1, and cloud device 150 may include application 400-1 and virtual machine 410. Data center device 120, cloud device 150, application 300-1, application 400-1, and virtual machine 410 may include the features described above in connection with, for example, one or more of FIGS. 1-6. In one example implementation, cloud device 150 may execute a continuous loop protocol, such as, for example, a spanning tree protocol.

As further shown in FIG. 7, cloud device 150, may establish an indirect connection 710 between application 300-1 and virtual machine 410, and may establish another indirect connection 710 between application 400-1 and virtual machine 410. Indirect connections 710 may include links and may enable applications 300-1 and 400-1 to securely exchange traffic 720 via virtual machine 410. In one example, virtual machine 410 may enable secure (e.g., encrypted) communication of information, such as traffic 720, between application 300-1 and application 400-1.

In one example implementation, cloud device 150, via application 400-1, may analyze traffic 720 received from application 300-1 to determine whether application 300-1 is a known and trusted neighbor of application 400-1. For example, application 400-1 may provide an address request message (e.g., an ARP request) to application 300-1. Application 300-1 may respond to the address request message with a reply message (e.g., an ARP reply back) that includes address information associated with application 300-1. The address information may include an Ethernet address of a server associated with application 300-1, an IP address of application 300-1, etc. Cloud device 150 may compare the address information with a data structure (e.g., a database, a table, a tree, or another arrangement of data) maintained by cloud device 150. In one example, the data structure may include a list of addresses of applications that are known and trusted neighbors of application 400-1, addresses of servers that host such applications, etc.

If the address information does not match an address provided in the data structure, cloud device 150 may determine that application 300-1 is not a known and trusted neighbor of application 400-1. Accordingly, cloud device 150 may permit application 400-1 and application 300-1 to continue to securely exchange traffic 720 via virtual machine 410 and indirect connections 710.

However, if the address information matches an address provided in the data structure, cloud device 150 may determine that application 300-1 is a known and trusted neighbor of application 400-1. When application 300-1 is known and trusted, cloud device 150 may designate application 400-1 as a secure client 730 and may designate application 300-1 as a secure server 740 for purposes of exchanging information. Alternatively, cloud device 150 may designate application 300-1 as secure client 730 and may designate application 400-1 as secure server 740 for purposes of exchanging information. Based on the secure client-server relationship between applications 400-1 and 300-1, cloud device 150 may establish a direct connection 750 between application 400-1 and application 300-1. Direct connection 750 may include a link and may enable traffic 720 to be directly and securely communicated between application 400-1 and application 300-1.

In one example implementation, the continuous loop protocol may not be applied to direct connection 750 because the continuous loop protocol may break direct connection 750 to prevent looping. However, without the continuous loop protocol, looping may still occur. Thus, cloud device 150 may apply various traffic rules to direct connection 750 in order to prevent looping via direct connection 750 and indirect connections 710. For example, application 400-1 may ignore traffic received from virtual machine 410, via indirect connection 710, when the traffic includes an address associated with application 300-1. Alternatively, or additionally, application 400-1 may drop traffic received from direct connection 750, when the traffic includes an address that is not associated with application 300-1. Alternatively, or additionally, application 300-1 may apply analogous traffic rules instead of or in addition to application 400-1.

Although FIG. 7 shows example operations capable of being performed by components of example network portion 700, in other implementations, example network portion 700 may include fewer components, different components, differently arranged components, or additional components than depicted in FIG. 7. Additionally, or alternatively, one or more components of example network portion 700 may perform one or more tasks described as being performed by one or more other components of example network portion 700.

Figure 8:
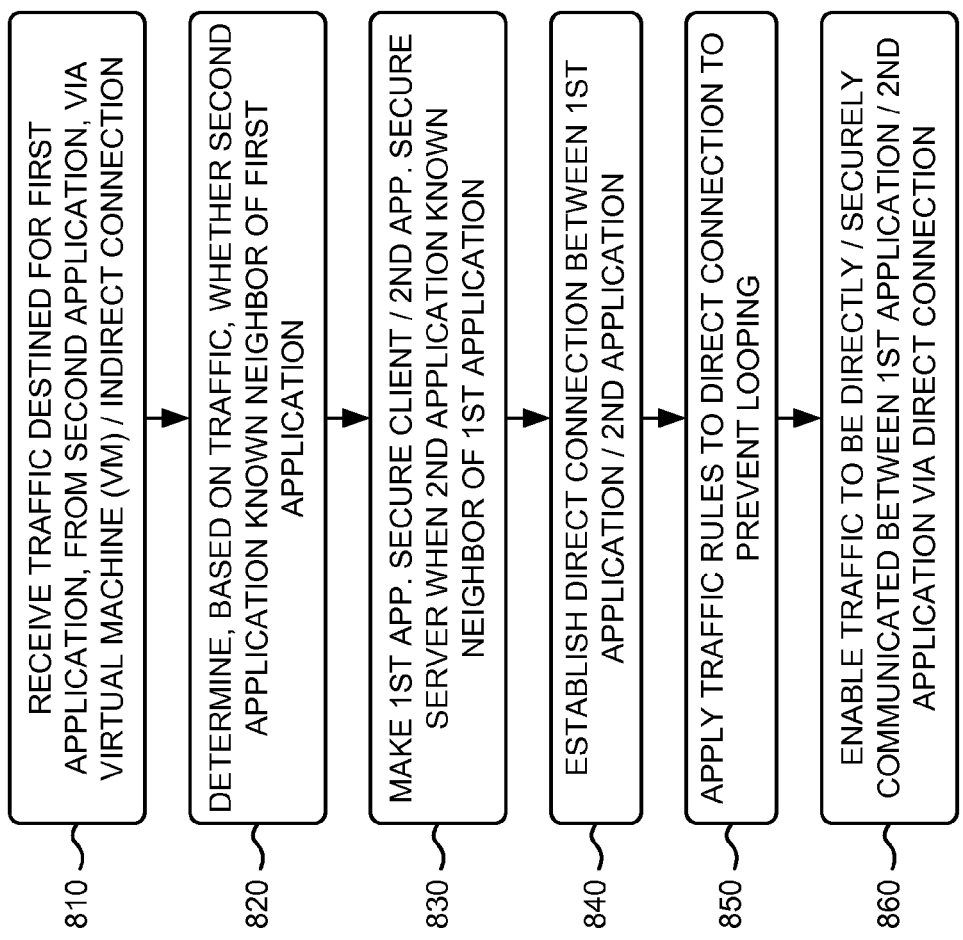
FIGS. 8-10 are flow charts of an example process for providing direct communication between applications in a cloud computing environment according to an implementation described herein.
Figure 9:
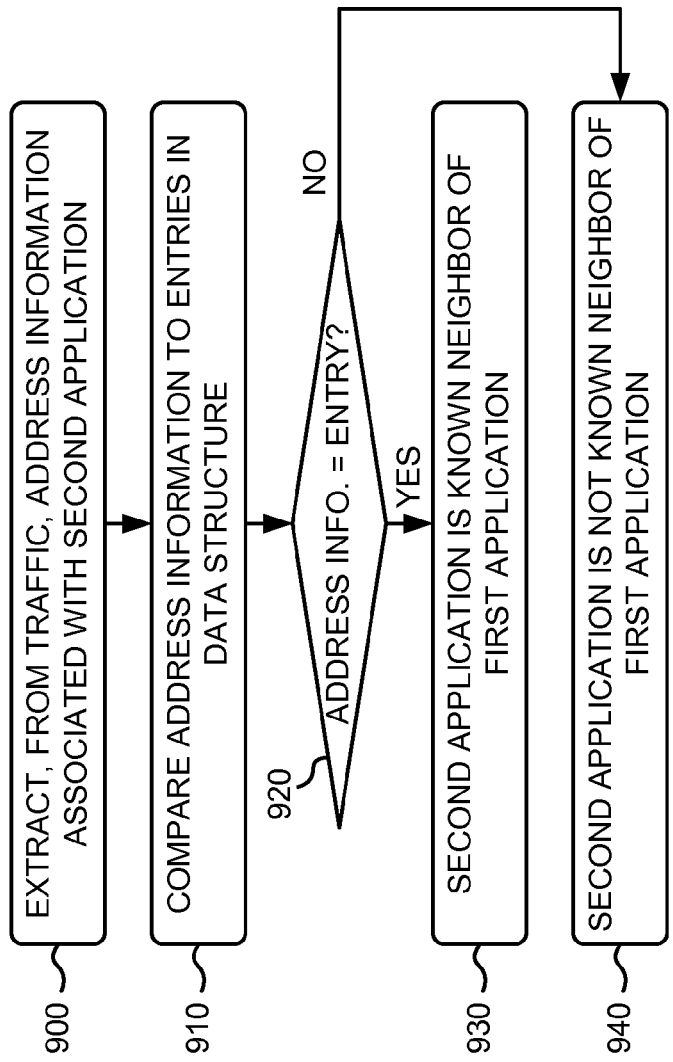
Figure 10:
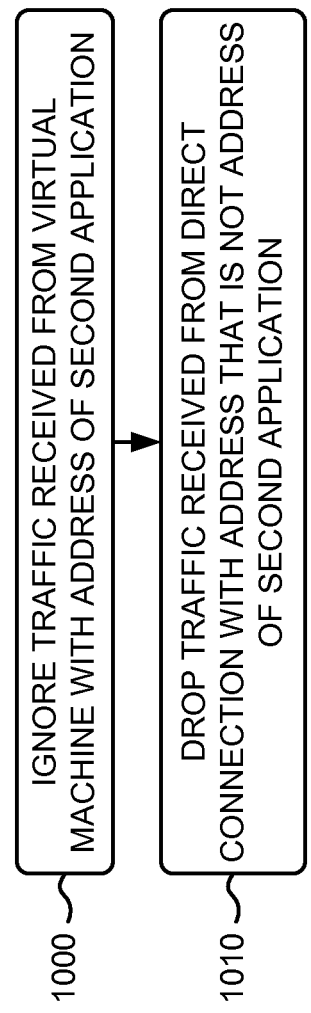

FIGS. 8-10 are flow charts of an example process 800 for providing direct communication between applications in a cloud computing environment according to an implementation described herein. In one implementation, process 800 may be performed by one or more cloud devices 150. Alternatively, or additionally, some or all of process 800 may be performed by another device or group of devices, including or excluding one or more cloud devices 150.

As shown in FIG. 8, process 800 may include receiving traffic destined for a first application, from a second application, via a virtual machine and an indirect connection (block 810), and determining, based on the traffic, whether the second application is a known neighbor of the first application (block 820). For example, in an implementation described above in connection with FIG. 5, cloud device 150, may establish indirect connection 510 between first application 400-1 and virtual machine 410, and may establish another indirect connection 510 between second application 400-2 and virtual machine 410. Indirect connections 510 may include links and may enable applications 400-1 and 400-2 to securely exchange traffic 520 via virtual machine 410. Cloud device 150, via first application 400-1, may analyze traffic 520 received from second application 400-2 to determine whether second application 400-2 is a known and trusted neighbor of first application 400-1.

As further shown in FIG. 8, process 800 may include making the first application a secure client and the second application a secure server when the second application is a known neighbor of the first application (block 830), and establishing a direct connection between the first application and the second application (block 840). For example, in an implementation described above in connection with FIG. 5, when second application 400-2 is known and trusted, cloud device 150 may designate first application 400-1 as secure client 530 and may designate second application 400-2 as secure server 540 for purposes of exchanging information. Alternatively, cloud device 150 may designate second application 400-2 as secure client 530 and may designate first application 400-1 as secure server 540 for purposes of exchanging information. Based on the secure client-server relationship between applications 400-1 and 400-2, cloud device 150 may establish direct connection 550 between first application 400-1 and second application 400-2.

Returning to FIG. 8, process 800 may include applying traffic rules to the direct connection to prevent looping (block 850), and enabling traffic to be directly and securely communicated between the first application and the second application via the direct connection (block 860). For example, in an implementation described above in connection with FIG. 5, direct connection 550 may include a link and may enable traffic 520 to be directly and securely communicated between first application 400-1 and second application 400-2. The continuous loop protocol may not be applied to direct connection 550 because the continuous loop protocol may break direct connection 550 to prevent looping. However, without the continuous loop protocol, looping may still occur. Thus, cloud device 150 may apply various traffic rules to direct connection 550 in order to prevent looping via direct connection 550 and indirect connections 510.

Process block 820 may include the process blocks depicted in FIG. 9. As shown in FIG. 9, process block 820 may include extracting, from the traffic, address information associated with the second application (block 900), and comparing the address information to entries in a data structure (block 910). For example, in an implementation described above in connection with FIG. 6, first cloud device 150-1, via first application 400-1, may analyze traffic 620 received from second application 400-2 to determine whether second application 400-2 is a known and trusted neighbor of first application 400-1. In one example, first application 400-1 may provide an address request message to second application 400-2. Second application 400-2 may respond to the address request message with a reply message that includes address information associated with second application 400-2. The address information may include an Ethernet address of a server associated with second application 400-2, an IP address of second application 400-2, etc. First cloud device 150-1 may compare the address information with a data structure (e.g., a database, a table, a tree, or another arrangement of data) maintained by first cloud device 150-1. The data structure may include a list of addresses of applications that are known and trusted neighbors of first application 400-1, addresses of servers that host such applications, etc.

As further shown in FIG. 9, process block 820 may include determining whether the address information matches an entry in the data structure (block 920). If the address information matches an entry in the data structure (block 920—YES), process block 820 may include determining that the second application is a known neighbor of the first application (block 930). If the address information does not match an entry in the data structure (block 920—NO), process block 820 may include determining that the second application is not a known neighbor of the first application (block 940). For example, in an implementation described above in connection with FIG. 6, if the address information does not match an address provided in the data structure, first cloud device 150-1 may determine that second application 400-2 is not a known and trusted neighbor of first application 400-1. If the address information matches an address provided in the data structure, first cloud device 150-1 may determine that second application 400-2 is a known and trusted neighbor of first application 400-1.

Process block 850 may include the process blocks depicted in FIG. 10. As shown in FIG. 10, process block 850 may include ignoring traffic, received from the virtual machine, which includes an address of the second application (block 1000), and dropping traffic, received from the direct connection, which includes an address that is not an address of the second application (block 1010). For example, in an implementation described above in connection with FIG. 5, first application 400-1 may ignore traffic received from virtual machine 410, via indirect connection 510, when the traffic includes an address associated with second application 400-2. First application 400-1 may ignore such traffic since first application 400-1 may already receive the traffic directly from second application 400-2, via direct connection 550. Alternatively, or additionally, first application 400-1 may drop traffic received from direct connection 550, when the traffic includes an address that is not associated with second application 400-2. Such a traffic rule may prevent first application 400-1 from receiving traffic from an untrusted source via direct connection 550.

Systems and/or methods described herein may enable a cloud computing environment to provide a direct connection between two or more neighboring applications so that the two applications may securely communicate traffic without utilizing indirect connections to a virtual machine.

The foregoing description of implementations provides illustration and description, but is not intended to be exhaustive or to limit the implementations to the precise form disclosed. Modifications and variations are possible in light of the above disclosure or may be acquired from practice of the implementations.

For example, while series of blocks have been described with regard to FIGS. 8-10, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, by a device, traffic destined for a first application,
      the traffic being received from a second application via a virtual machine and an indirect connection;
   determining, by the device and based on the traffic, whether the second application is a known and trusted neighbor of the first application;
   establishing, by the device, a direct connection between the first application and the second application, when the second application is a known and trusted neighbor of the first application;
   applying, by the device, traffic rules to the direct connection,
      the traffic rules including a rule to drop particular traffic received from the virtual machine, via the indirect connection, when the particular traffic includes an address associated with the second application and when the direct connection between the first application and the second application is established; and
   enabling, by the device, the traffic to be directly and securely communicated between the first application and the second application via the direct connection.

2. The method of claim 1, further comprising:
   making the first application a secure client and the second application a secure server, when the second application is a known and trusted neighbor of the first application.

3. The method of claim 1, further comprising:
   making the first application a secure server and the second application a secure client, when the second application is a known and trusted neighbor of the first application.

4. The method of claim 1, where determining whether the second application is a known and trusted neighbor of the first application further comprises:
   extracting, from the traffic, address information associated with the second application;
   comparing the address information to entries in a data structure; and
   determining that the second application is a known and trusted neighbor of the first application when one of the entries in the data structure matches the address information.

5. The method of claim 4, further comprising:
   determining that the second application is not a known and trusted neighbor of the first application when none of the entries in the data structure match the address information.

6. The method of claim 1, where the rule to drop the particular traffic received from the virtual machine causes the first application to ignore the particular traffic received from the virtual machine.

7. The method of claim 1, where the particular traffic is a first particular traffic and the address is a first address, and where applying the traffic rules to the direct connection comprises:
dropping second particular traffic received from the direct connection when the second particular traffic includes a second address that is not associated with the second application.

8. A device, comprising:
a processor to:
receive traffic destined for a first application,
the traffic being received from a second application via a virtual machine and an indirect connection,
determine, based on the traffic, whether the second application is a trusted neighbor of the first application,
create a direct connection between the first application and the second application, when the second application is a trusted neighbor of the first application,
utilize traffic rules for the direct connection,
the traffic rules including a rule to drop particular traffic received from the virtual machine, via the indirect connection, when the particular traffic includes an address associated with the second application and when the direct connection between the first application and the second application is established, and
enable the traffic to be directly and securely communicated between the first application and the second application via the direct connection.

9. The device of claim 8, where the processor is further to:
designate the first application as a secure client and the second application as a secure server, when the second application is a trusted neighbor of the first application.

10. The device of claim 8, where the processor is further to:
designate the first application as a secure server and the second application as a secure client, when the second application is a trusted neighbor of the first application.

11. The device of claim 8, where, when determining whether the second application is a trusted neighbor of the first application, the processor is further to:
extract, from the traffic, address information associated with the second application,
compare the address information to entries in a data structure, and
determine that the second application is a trusted neighbor of the first application when one of the entries in the data structure matches the address information.

12. The device of claim 11, where the processor is further to:
determine that the second application is not a trusted neighbor of the first application when none of the entries in the data structure match the address information.

13. The device of claim 8, where the rule to drop the particular traffic received from the virtual machine causes the first application to ignore the particular traffic received from the virtual machine.

14. The device of claim 8, where the particular traffic is a first particular traffic and the address is a first address, and where, when utilizing the traffic rules for the direct connection, the processor is further to:
drop second particular traffic received from the direct connection when the second particular traffic includes a second address that is not associated with the second application.

15. A non-transitory computer-readable medium, comprising:
one or more instructions that, when executed by one or more processors of a device, cause the one or more processors to:
receive traffic destined for a first application, the traffic being received from a second application via a virtual machine and an indirect connection,
determine, based on the traffic, whether the second application is a known and trusted neighbor of the first application,
establish a direct connection between the first application and the second application, when the second application is a known and trusted neighbor of the first application,
apply traffic rules to the direct connection,
the traffic rules including a rule to drop particular traffic received from the virtual machine, via the indirect connection, when the particular traffic includes an address associated with the second application and when the direct connection between the first application and the second application is established, and
enable the traffic to be directly and securely communicated between the first application and the second application via the direct connection.

16. The non-transitory computer-readable medium of claim 15, further comprising:
one or more instructions that, when executed by the one or more processors of the device, cause the one or more processors to one of:
make the first application a secure client and the second application a secure server, when the second application is a known and trusted neighbor of the first application, or
make the first application a secure server and the second application a secure client, when the second application is a known and trusted neighbor of the first application.

17. The non-transitory computer-readable medium of claim 15, further comprising:
one or more instructions that, when executed by the one or more processors of the device, cause the one or more processors to:
extract, from the traffic, address information associated with the second application,
compare the address information to entries in a data structure, and
determine that the second application is a known and trusted neighbor of the first application when one of the entries in the data structure matches the address information.

18. The non-transitory computer-readable medium of claim 17, further comprising:
one or more instructions that, when executed by the one or more processors of the device, cause the one or more processors to:
determine that the second application is not a known and trusted neighbor of the first application when none of the entries in the data structure match the address information.

19. The non-transitory computer-readable medium of claim 15, where the rule to drop the particular traffic received from the virtual machine causes the first application to ignore the particular traffic received from the virtual machine.

20. The non-transitory computer-readable medium of claim 15, where the rule is a first rule, the particular traffic is a first particular traffic, and the address is a first address, and where the traffic rules include:
   a second rule for dropping second particular traffic received from the direct connection when the second particular traffic includes a second address that is not associated with the second application.

* * * * *